A. SHARLOW.
Egg Boiler.
No. 47,228.
Patented April 11, 1865.
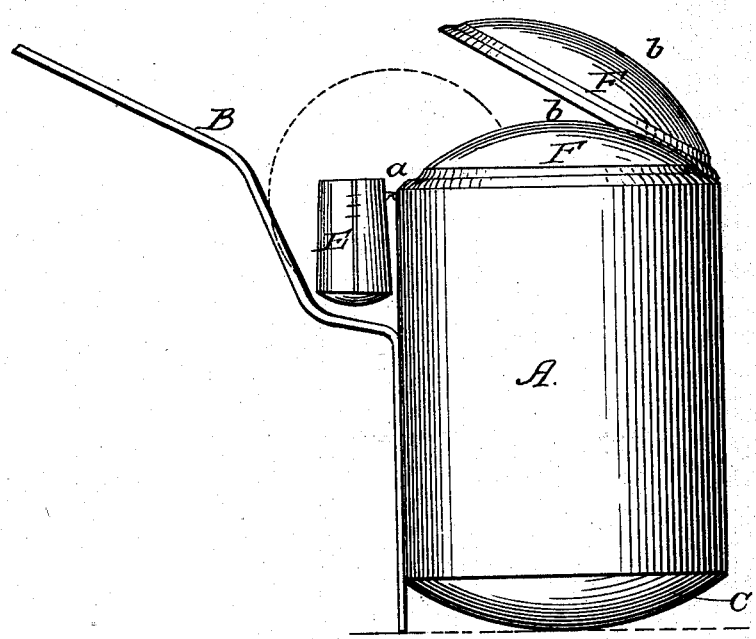
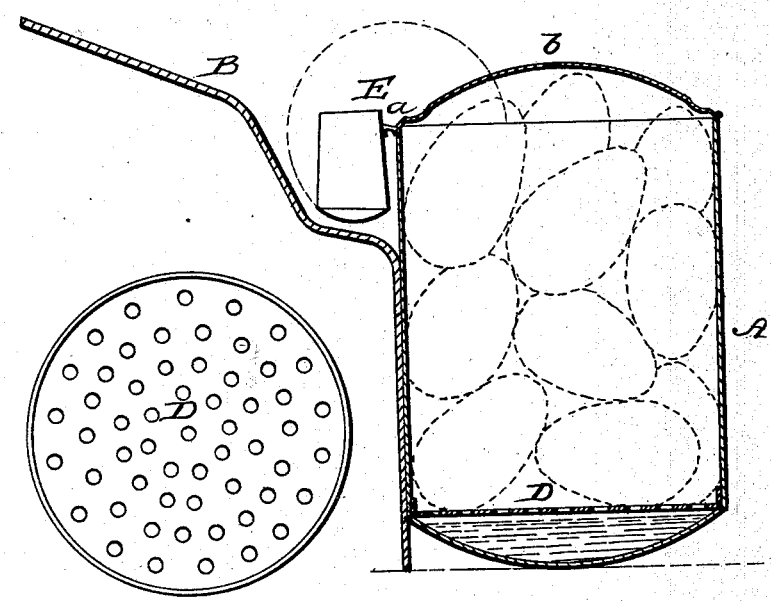
WITNESSES
INVENTOR

UNITED STATES PATENT OFFICE.

ABEL SHARLOW, OF FORT LEE, NEW JERSEY.

EGG-BOILER.

Specification forming part of Letters Patent No. 47,228, dated April 11, 1865.

*To all whom it may concern:*

Be it known that I, ABEL SHARLOW, of Fort Lee, county of Bergen, and State of New Jersey, have invented a new and useful Vessel for Cooking Eggs and a Method of Applying the Same; and I do hereby declare that the following is a full and exact description thereof, reference being had to the accompanying drawings, and to the letters of reference marked thereon.

The nature of my invention consists in constructing a vessel in which it is especially intended to boil eggs, and, further, in applying a certain method to effect such result.

To enable others skilled in the art to make and use my invention, I will proceed to describe it.

The common method of boiling eggs by immersion in hot or boiling water for several minutes is too well understood to need description, as also must be the objections, uncertainty, &c., attending the same as to time, &c. To remedy these it is that I have perfected my invention referred to.

In the drawings, A represents a cylindrical vessel, about the capacity of a quart measure, having a handle, B, which, in being extended, forms a steadying foot, more or less desirable or necessary on account of the roundness of the bottom c.

D is a strainer or perforated disk, on which the eggs rest, located above the bottom, leaving sufficient space for the water below it.

E is a small water-measure attached or hinged for convenience to the vessel at a. The disk or false bottom being in place and the vessel filled or partially filled with eggs, the measure of water is poured over them, (this may be done, however, beforehand,) the lid F, which is also hinged for convenience, turned down, and the vessel put on the fire.

It will be seen the lid has a small hole, b, in it at the center. The water used does not fill the space between the curved bottom and the false one alone. Of course, steam will soon be generated, whether hot or cold water be used. This steam, being somewhat confined, passes between, and, coming in contact with the eggs, affects them, and when it ceases to escape from the hole b in the lid F the eggs will be known to be done, and they can easily be transferred to a dish for the table.

The measure E may be graduated and more or less water used by which to regulate the degree of cooking of the eggs, for instance, soft, medium, or hard.

It will be seen from the above description what trouble is saved by the use of my vessel, as also in the method, and a certainty obtained as to the result.

Without departing from the nature of my invention, the vessel A may be made shallower, and the bottom D have a central stem, and otherwise arranged so that all the eggs can be put in or taken out by one operation.

What I claim as new, and desire to secure by Letters Patent, is—

As a new article of manufacture, the culinary vessel A, when constructed and operated substantially as described, for the purpose set forth.

ABEL SHARLOW.

Witnesses:
M. FITZGERALD,
BENJ. F. SHAFFER.